UNITED STATES PATENT OFFICE.

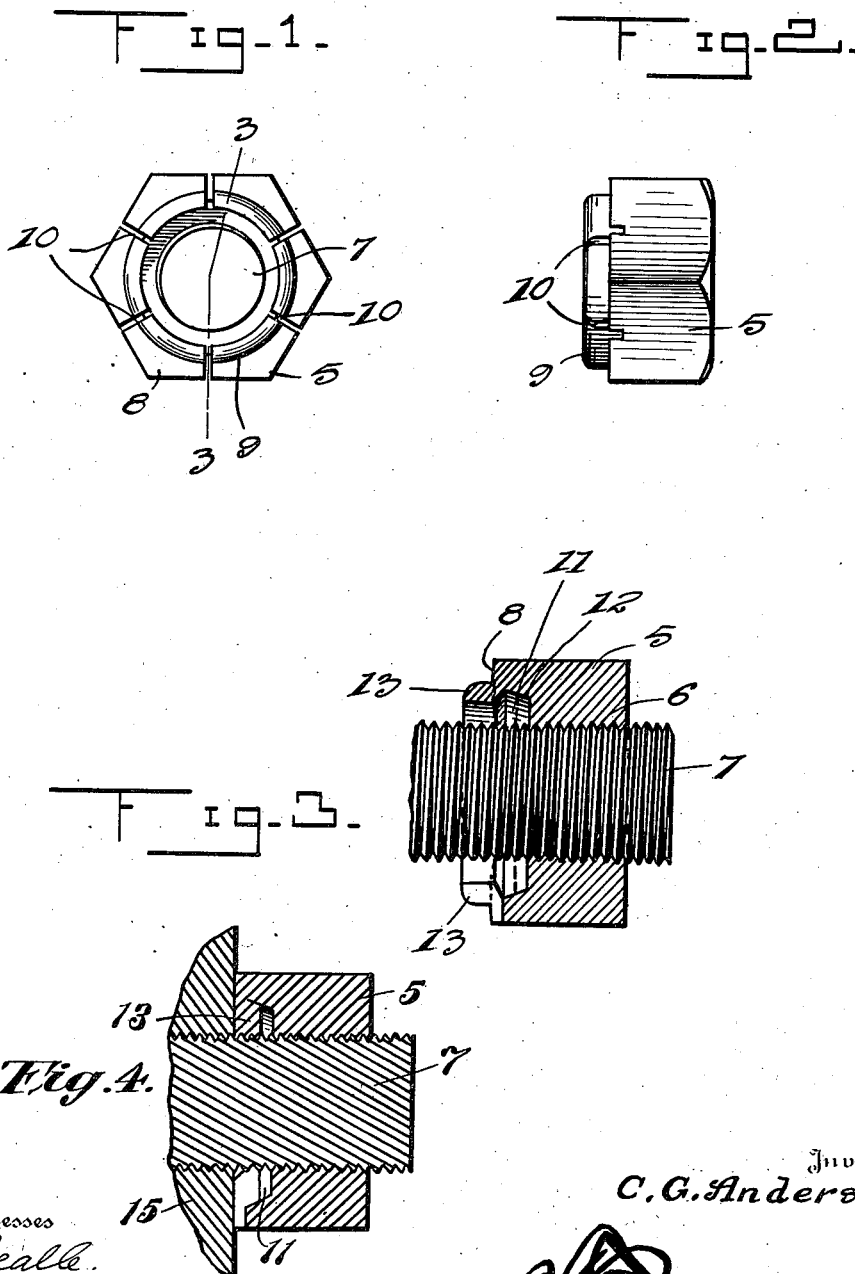

CHARLIE G. ANDERSON, OF SIKESTON, MISSOURI.

LOCK-NUT.

1,191,754.  Specification of Letters Patent.  Patented July 18, 1916.

Application filed December 7, 1914. Serial No. 875,877.

*To all whom it may concern:*

Be it known that I, CHARLIE G. ANDERSON, a citizen of the United States, residing at Sikeston, in the county of Scott and State of Missouri, have invented certain new and useful Improvements in Lock-Nuts; and I do hereby declare the following to be a full, clear, and exact description of the invention, such as will enable others skilled in the art to which it appertains to make and use the same.

This invention has for its object to provide a novel and efficient lock nut including means whereby the nut, when advanced against an object on a bolt, is automatically and reliably locked against removal.

Another object is the provision of a lock nut having an integral object engaging flange on one face thereof and an annular groove or channel in the threaded bore thereof into which the object-engaging flange is adapted to be bent as the nut is advanced against the object to lock said nut against removal.

With these and other objects in view, the invention consists in the novel construction, arrangement and formation of parts as will be hereinafter specifically described, claimed and illustrated in the accompanying drawing, in which:

Figure 1 represents a front elevation of the object-engaging face of the nut. Fig. 2 represents a side elevation of the nut, Fig. 3 represents a transverse sectional view through the nut applied to a bolt, and Fig. 4 represents a transverse sectional view through the nut, illustrating the locking flange turned inwardly or upset by engagement with an object.

Referring to the drawing in detail, wherein similar reference numerals designate corresponding parts throughout the several views, the numeral 5 indicates generally the nut which may be of any desired shape and is formed with the usual threaded bore 6 adapted to fit the external screwthreads of a bolt 7. The object-engaging face 8 of the nut 5 is formed with an integral annular flange 9, which is disposed concentrically relative to the bore 6 and in spaced relation to the bolt 7. The flange 9 is slit or cut at intervals, as indicated at 10, to provide a plurality of curved sections, whereby the flange may be more readily turned inwardly, as will be hereinafter described.

The bore 6 of the nut 5 is enlarged adjacent the object-engaging face 8 thereof to provide an annular concentric groove or channel 11, the outer wall 12 of which is flared outwardly toward the object-engaging face of the nut.

In use, the bolt 7 is positioned through the object to be clamped and the nut 5 is advanced thereon by rotation in the usual manner. As the sections comprising the flange 9 engage the object 15 and rotation of the nut 5 is continued said flange is turned inwardly and seated in the groove 11 as illustrated in dotted lines in Fig. 3 and in full lines in Fig. 4 and forcibly engages and grips the threads of the bolt 7, thus reliably locking the nut against rotation upon the bolt. The corner 13 of the flange 9 is preferably rounded so as to assist in turning the flange inwardly into the groove 11.

What I claim is:

1. A lock nut having an internally screw-threaded bore and an annular groove in the wall of said bore adjacent the object-engaging face thereof, and an annular flange formed on the object-engaging face of said nut and having a greater internal diameter than the bore of said nut and adapted to be turned inwardly into said groove as the nut is advanced against an object.

2. A lock nut having an internally screw-threaded bore and an annular groove formed in the wall of said bore adjacent the object-engaging face thereof, and a flange on the object-engaging face of said nut having a greater internal diameter than the diameter of said bore and having the outer corner rounded.

3. A lock nut having a threaded bore and an annular groove formed in the wall of said bore adjacent the object-engaging face thereof, the wall of said groove being flared outwardly toward the object-engaging face of said nut, and an annular flange formed on the object-engaging face of said nut of greater internal diameter than the diameter of said bore and adapted to be turned inwardly into said groove as the nut is advanced against an object.

In testimony whereof I affix my signature in presence of two witnesses.

CHARLIE G. ANDERSON.

Witnesses:
  HARRY C. BLANTON,
  G. C. MONTGOMERY.